United States Patent [19]

Blyler, Jr. et al.

[11] Patent Number: 4,482,204
[45] Date of Patent: Nov. 13, 1984

[54] ULTRAVIOLET ABSORBERS IN OPTICAL FIBER COATINGS

[75] Inventors: Lee L. Blyler, Jr., Basking Ridge; Frank V. DiMarcello, Clinton Township, Hunterdon County, both of N.J.

[73] Assignee: AT&T Bell Laboratories, Murray Hill, N.J.

[21] Appl. No.: 123,954

[22] Filed: Feb. 25, 1980

[51] Int. Cl.³ .............................................. G02B 5/172
[52] U.S. Cl. ................................. 350/96.34; 65/3.11; 204/159.19; 350/96.30; 427/54.1; 427/163
[58] Field of Search ................... 350/1.1, 96.30, 96.31, 350/96.33, 96.34; 65/3.11, 3.4, 3.41, 3.43, 3.44; 204/159.19; 427/54.1, 163

[56] References Cited

U.S. PATENT DOCUMENTS

| | | | |
|---|---|---|---|
| 4,099,837 | 7/1978 | Vazirani | 350/96.29 |
| 4,105,284 | 8/1978 | Olshansky | 350/96.33 |
| 4,111,525 | 9/1978 | Kaminow et al. | 350/96.31 |
| 4,125,644 | 11/1978 | Ketley et al. | 427/54.1 |
| 4,129,667 | 12/1978 | Lorenz et al. | 204/159.19 X |
| 4,135,007 | 1/1979 | Lorenz et al. | 204/159.19 X |
| 4,263,366 | 4/1981 | Lorenz et al. | 427/54.1 X |

FOREIGN PATENT DOCUMENTS

| | | | |
|---|---|---|---|
| 0034736 | 3/1976 | Japan | 350/96.34 |
| 1029335 | 7/1964 | United Kingdom . | |
| 1130717 | 3/1966 | United Kingdom . | |
| 1186777 | 5/1967 | United Kingdom . | |
| 1287954 | 9/1969 | United Kingdom . | |
| 1393488 | 9/1972 | United Kingdom . | |

OTHER PUBLICATIONS

Kats et al, "The Effect of U.V. and X-Ray Radiation On . . . ", *Philips Res. Rep.*, vol. 11, 1956, pp. 115–156.
Marsik et al, "13th IEEE Photovoltaic Specialists Conf.-1978", *Prelim. Eval. of Glass Resin Materials . . .*, Jun. 1978, pp. 624–627.
Freibele et al, "Radiation Response of Fiber Optic Waveguides In . . . ", *IEEE Trans. on Nuclear Science*, vol. NS-25, No. 6, Dec. 1978, pp. 1261–1266.
Bettis et al, "Refractive-Index Dependence of Pulsed-Laser-Induced Damage", *Optics Letters*, vol. 4, No. 8, Aug. 1979, pp. 256–258.

*Primary Examiner*—John Lee
*Attorney, Agent, or Firm*—James H. Fox

[57] ABSTRACT

Optical fibers having ultraviolet-cured coatings and reduced optical transmission losses are produced. An ultraviolet-absorbing material is incorporated in at least one coating layer. This reduces damage in the glass fiber due to the ultraviolet-curing radiation, while still allowing rapid curing of the coating. Single layer coatings and dual layer coatings are described. A single layer coating having reduced microbending losses due to partial curing of the inner portion of the coating is also described.

18 Claims, 6 Drawing Figures

UNCOATED FIBERS

SINGLE LAYER COATING

DUAL LAYER COATING

ULTRAVIOLET ABSORBERS IN OPTICAL FIBER COATINGS

BACKGROUND OF THE INVENTION

1. Field of the Invention

This invention relates to reducing optical losses in optical fibers having an ultraviolet-cured coating.

2. Description of the Prior Art

A coated optical fiber, as used in various applications including communications, typically includes a tough but flexible polymer coating material which surrounds the optical fiber. The optical fiber itself is typically silica glass, with various additives included to obtain desired optical properties. The coating material is usually designed to protect the optical fiber from scratches and surface abrasion. Additionally, a coating may serve to reduce microbending losses, and allow easier handling of the fiber.

One conventional method of coating an optical fiber is by applying a prepolymer material, typically a liquid, which is then cured on the fiber by heating. More recently, ultraviolet-cured coatings have been developed. These ultraviolet (UV) coating materials typically comprise prepolymer material to which an ultraviolet sensitive photoinitiator material is added; see U.S. Pat. No. 4,099,837, assigned to the same assignee as the present invention. It is also known to produce fibers having dual layer coatings, wherein the inner layer is relatively soft and flexible, in order to further reduce microbending losses. For this purpose, the inner layer typically comprises silicone or comparable compliant buffer materials. The outer layer is typically made of a more abrasion-resistant material, as in the case of single layer coatings. Either or both of these layers could include ultraviolet-cured material.

Although ultraviolet radiation is necessary to cure these coatings, it is known that ultraviolet radiation may increase optical losses in silica glass doped with various materials; see, for example, "The Effect of UV and X-Ray Radiation on Silicate Glasses, Fused Silica, and Quartz Crystals," A. Kats and J. M. Stevels, *Philips Research Report* 11, pp. 115–156, 1956. It therefore may be necessary in certain circumstances to find ways of preventing the ultraviolet light used to cure the polymer coating from increasing optical losses in optical fibers.

SUMMARY OF THE INVENTION

We have invented a method of reducing the optical losses in optical fibers that have ultraviolet-cured coatings. An ultraviolet-absorbing material that does not form a substantial amount of free radicals when exposed to ultraviolet curing radiation is incorporated into a coating layer of the fiber. In one embodiment, the ultraviolet-absorbing material preferentially absorbs the shorter, more damaging ultraviolet weavelengths, while absorbing less the longer UV wavelengths that activate the coating photoinitiator material. In another embodiment, the absorber material prevents complete curing of the interior of the UV-cured coating, obtaining a reduction in microbending losses as compared to completely cured single layer coatings. In the case of multiple layer coatings, the ultraviolet-absorbing material is preferentially placed in an inner coating.

DETAILED DESCRIPTION

The following description relates to reducing losses in optical fibers having ultraviolet (UV)-cured coatings. We have found that silica glass fibers doped with germanium or phosphorus or both have increased losses in the infrared, visible, and ultraviolet portions of the spectrum after being irradiated by ultraviolet light. Such radiation typically occurs when the ultraviolet-curable coatings on the fibers are cured.

Figure 1:
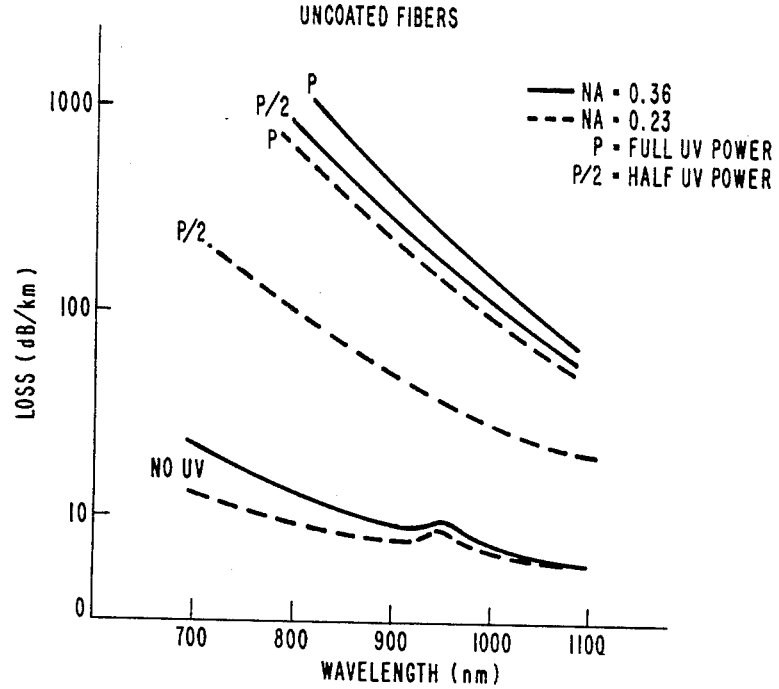
FIG. 1 shows the optical losses of certain uncoated fibers when exposed to ultraviolet light.

FIG. 1 shows the loss properties of graded index silica optical fibers doped with germanium dioxide and either phosphorus pentoxide or boron trioxide for two different numerical aperture (NA) levels. The 0.36 NA fiber has a germanium-phosphosilicate core, while the 0.23 NA fiber has a germanium-borosilicate core. The higher NA level corresponds to a higher germanium doping level. The bottom curves show fibers that have not been exposed to ultraviolet radiation. The top curves show fibers that have been exposed to different levels of ultraviolet radiation. All the fibers shown in FIG. 1 are uncoated. The fibers were drawn at a speed of approximately one-half meter per second past 2 medium pressure mercury vapor lamps rated at 200 watts per inch (full power) mounted in a housing containing elliptic reflectors. Half-power UV exposure loss curves are also shown. Total exposure time was approximately 1 second.

As can be seen from FIG. 1, losses greatly increase at shorter wavelengths, and also increase for higher germanium doping levels and higher UV radiation power levels. Further tests (not shown) reveal that the phosphorus dopant alone or the germanium dopant alone will increase loss levels in silica fibers exposed to UV radiation. It is estimated that a germanium dioxide doping concentration of 10 weight percent or more will lead to significant additional losses due to UV curing, regardless of whether other dopants (e.g., boron) are present. A phosphorus pentoxide concentration of 0.5 weight percent or more will lead to additional losses. In a graded index fiber, the phosphorus concentration is typically uniform in the core of the fiber, while the germanium concentration is typically higher in the center of the core, with the above-noted percentages referring to the maximum concentration in the core. However, UV-induced losses may also occur if significant amounts of the above-named dopants are in the cladding of a silica fiber.

The polymer material used in the UV-cured coating herein is a poly(urethane acrylate) resin, marketed as No. 59KU0519U by Borden, Inc., referred to hereafter as the "poly(urethane acrylate) resin." The photoinitiator is 2,2-dimethoxy-2-phenyl acetophenone, marketed as Irgacure 651 by the Ciba-Geigy Company. This photoinitiator is added approximately 2 percent by weight to the poly(urethane acrylate) resin to form a UV-curable coating. However, the problems and solutions noted herein are applicable to other polymer/photoinitiator combinations. The present invention is also applicable to polymer material that is UV-curable without the aid of a photoinitiator material.

Figure 2:
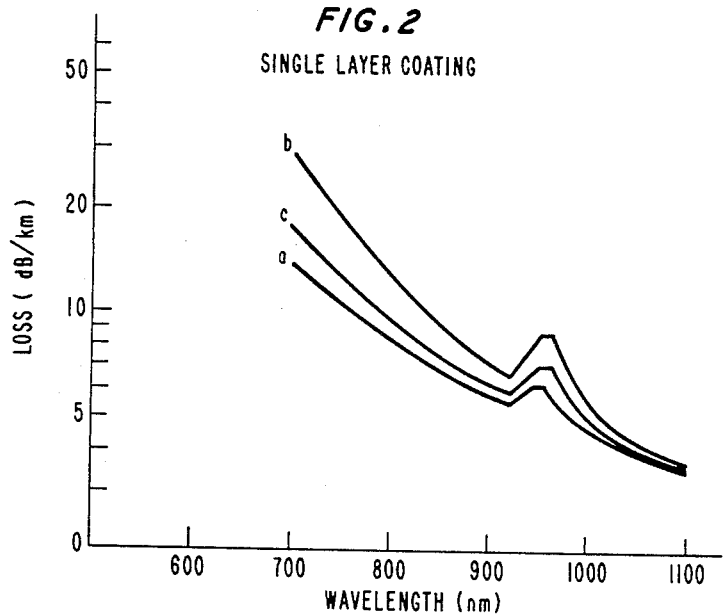
FIG. 2 shows a typical reduction of optical losses due to UV-absorbing material in a single layer coating.

FIG. 2 compares spectral losses for three 0.36 NA fibers drawn from the same preform and coated as next described. A first fiber (Curve a) was coated without UV exposure with thermally cured material while a second fiber (Curve b) was coated with the above-named UV-curable coating and exposed to UV radiation as above. The fiber with the UV-cured coating (Curve b) has excess losses amounting to 14 dB/km at 700 nm and 1.2 dB/km at 900 nm. The third fiber (Curve c) is discussed in Example 1 below. We have found that three UV-radiation-induced losses depend upon coating thickness in the range of 10 to 50 microns, but are not very dependent upon drawing speed (time of exposure).

Figure 3:
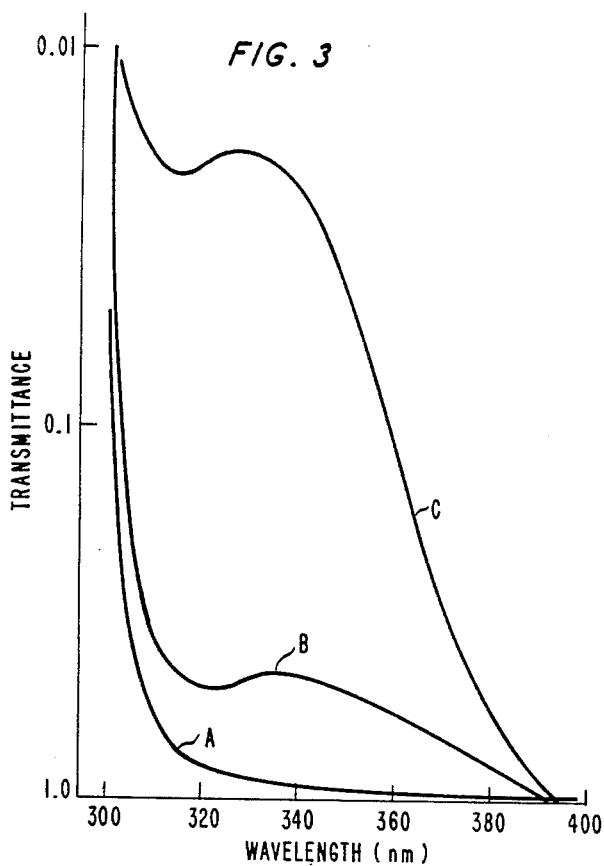
FIG. 3 shows the ultraviolet absorption spectra of coating material with and without a given type of ultraviolet-absorbing material added.

In order to understand these results for the first and second fiber, the coating polymer has been examined by ultraviolet spectroscopy. The transmission spectra obtained from 50 micron thick films of the uncured polymer (prepolymer) are shown in FIG. 3. The spectra for the cured polymer is substantially equivalent. Curve A shows the transmittance of the poly(urethane acrylate) resin only, while curve B shows the transmittance for the resin having 2 percent by weight of the photoinitiator added. It is evident that the polymer absorbs weakly in the spectral range from 310 to 400 nm but absorbs very strongly below about 300 nm. Thus the coating effectively screens or "cuts off" wavelengths below 300 nm, preventing damage to the core glass by short UV wavelengths. However, the coating is transparent to wavelengths greater than about 300 nm, which produce some added loss. It is helpful, therefore, to move the "cut-off" to somewhat longer wavelengths. This must be done, however, without interfering with the photoinitiator which absorbs in this region and which breaks down to form free radicals to initiate the polymerizing reaction in the coating.

Any attempted solution to the UV damage problem must not significantly limit the curing rate of the UV-cured polymer. This is because the economics of larges-cale optical fiber production dictate a high drawing rate. Currently, fibers are typically drawn at high temperature from a glass preform, such as that obtained by the modified chemical vapor deposition (MCVD) process. This drawn fiber is most advantageously coated with the prepolymer material, and UV-cured, in one continuous operation. The drawing speeds are currently typically in the range of 1 to 1.5 meters per second, with increases in speed likely.

One solution would appear to be adding more photoinitiator to the prepolymer material. This would reduce the radiation reaching the fiber, since the photoinitiator is an absorber of UV radiation and would, if anything, increase the cure rate. However, this is generally not a satisfactory solution. The UV photoinitiators break down to form free radicals that promote the polymerization of the prepolymer material. If present in a quantity in excess of that necessary for polymerization, the excess free radicals may cause additional crosslinking of the polymer, possibly leading to long-term degradation, as by embrittlement.

UV absorbers that do not form free radicals upon radiation would be less likely to cause long-term stability problems in the polymer. However, it would appear that their presence in the prepolymer would necessarily limit the cure rate. Increasing the UV radiation does to compensate would be no solution, as this would only increase the damage in the glass fiber.

Surprisingly, it has been found that UV absorbers that do not form a substantial amount of free radicals capable of promoting polymerization in the presence of UV radiation can significantly reduce the UV damage to the glass fiber without significantly reducing the cure rate. As a measure of free radical production, the term "UV absorber" is distinguished from "UV photoinitiator" herein on the basis of the UV cure rate of prepolymers doped with such material. In particular, an acrylate prepolymer having 1 weight percent of Irgacure 651 photoinitiator was found to fully cure at least 100 times faster at a given UV dose rate than a comparable sample of the acrylate prepolymer (without photoinitiator) having 1 weight percent of the Cyasorb 531 UV absorber. The other UV absorbers named herein are believed to also produce at least a 100 to 1 cure rate difference compared to typical photoinitiators. The effect of combining both UV photoinitiator and UV absorber material in the polymer resin is shown by the following example:

EXAMPLE 1

One percent by weight of an organic UV absorber, 2-hydroxy-4-n-octoxybenzophenone, (Cyasorb UV 531, American Cyanamid, Inc.) was added to the poly(urethane acrylate) resin, which also contained 2 percent by weight of the Irgacure 651 photoinitiator. The absorber alters the UV spectrum of the resin as depicted in curve C of FIG. 3. A fiber was then drawn from the same preform as used previously in FIG. 2 (NA=0.36) and coated with the new resin formulation. No difficulties in curing the formulation were encountered. The resulting spectral loss curve is shown in Curve c in FIG. 2. The added losses at 700, 800, and 900 nm have been reduced from 14, 4, and 1.2 dB/km to 3, 1.0, and 0.4 dB/km respectively. Thus UV-curable coatings may be formulated which allow UV-radiation-induced losses in optical fibers, including high NA optical fibers, to be effectively controlled.

This fortuitous result is due in part to the fact that the peak of the absorption spectrum of the UV absorber is such that it does not substantially attenuate all radiation within the absorption spectrum of the photoinitiator. For example, the Irgacure 651 photoinitiator absorbs in the wavelength range of 300 nm to 400 nm. The UV absorber, Cyasorb UV 531, mainly attenuates wavelengths shorter than about 360 nm in the concentration used. Thus, even though somewhat attenuated, wavelengths longer than about 360 nm are available with sufficient intensity for curing the polymer. Since it is mainly the shorter wavelengths that produce damage to the glass fiber, it is possible to obtain both a high cure rate and reduced optical losses due to UV damage.

A second attribute of the absorber technique is that it has little effect on the curing rate at the surface of the coating, regardless of what wavelengths are absorbed. That is, even if the UV radiation is greatly absorbed before reaching the interior of the coating, the radiation intensity will still be relatively high at the outer surface of the coating. Therefore, surface tackiness can be avoided, and thus a relatively high drawing rate maintained, even if the absorber attenuates a broad range of UV wavelengths.

Although some reduction of the cure rate is likely in the interior of the coating due to the presence of the UV absorber, the above-noted effects can be utilized to minimize such reduction, while still reducing UV damage to the glass fiber.

Figure 5:
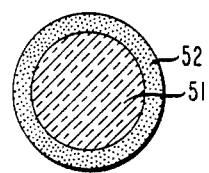
FIG. 5 shows an optical fiber having a single layer coating.
Figure 6:
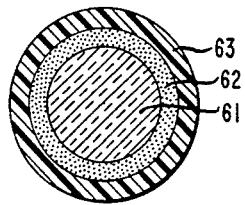
FIG. 6 shows an optical fiber having a dual layer coating.

The foregoing has been directed mainly to an optical fiber 51 having a single coating layer 52 as shown in FIG. 5. However, fibers having multiple coating layers may also be protected as shown in FIG. 6, wherein the ultraviolet-absorbing material is placed in an inner layer 62. This allows normal curing of the outer layer 63 while protecting the glass optical fiber 61 from the ultraviolet radiation. As used herein, the term "inner layer" means any coated layer between the outermost UV-cured layer and the optical fiber, with multiple inner layers being possible. The inner layer 62 is typically thermally cured silicone or other relatively soft, flexible material that reduces microbending losses in the glass fiber. However, an inner layer can be of UV-curable material. In addition, an inner layer can be of material other than soft, flexible material and can be for various purposes, including use as a strength member. The use of a UV absorber in a typical dual layer coating will be further illustrated by the following example:

EXAMPLE 2

Figure 4:
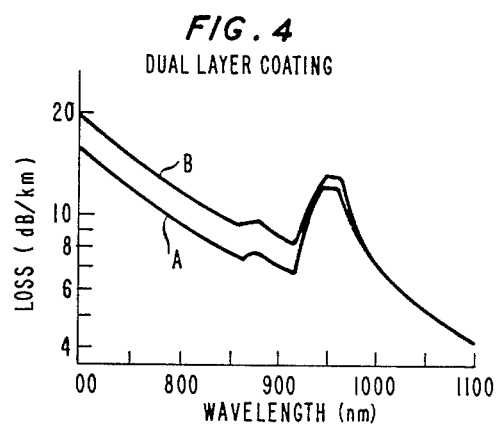
FIG. 4 shows a typical reduction of optical losses due to UV-absorbing material in a dual layer coating.

The two fibers used in this example are germanium phosphosilicate optical fibers having an NA of 0.36, and drawn from the same preform. They were first coated with a 40 micron thick layer comprising a silicone rubber, which was thermally cured. The silicone rubber was a two-part addition cure rubber trade-named KE 103 RTV by the Shin-Etsu Chemical Company. The first fiber (A) included 1 weight percent of the Cyasorb 531 UV absorber in the silicone layer, whereas the second fiber (B) had no UV absorber. Thw two coated fibers next had a second coating applied, 30 microns thick, consisting of the poly(urethane acrylate) resin and 2 weight percent of the Irgacure 651 photoinitiator. The two fibers were then exposed to UV radiation as above to cure the second coating. The loss properties of the fiber with the UV absorber is shown as curve A in FIG. 4, while the loss properties of the fiber without the UV absorber is shown as curve B.

This example shows a typical reduction of optical loss obtained by placing the UV absorber in an inner coating layer of a fiber having multiple coating layers. Alternately, or additionally, the UV absorber could be placed in the outer coating layer. However, if a fully cured outer coating is desired, placing the UV absorber in an inner coating layer that is not cured by UV is preferable. This placement allows a wider choice of UV absorber and photoinitiator materials, and a greater concentration of UV absorber, without interfering with the UV curing of the outer layer. In the case of multiple layer coatings where the UV absorber is not placed in a layer that is cured by UV radiation, the term "UV absorber" as used herein means any substance that absorbs damaging UV radiation at least 100 times more strongly than a comparable amount of the polymer coating material of that layer. In any case, however, the concentration of UV absorber in a given coating layer is at least 0.1 weight percent in practicing the present invention.

In fact, it is even possible to achieve an effect similar to that obtained with the above-noted dual layer coating by the use of an absorber in a single layer coating.

As noted above, the presence of the UV absorber will not greatly reduce the cure rate at the outer surface of the coating. If the UV absorber is present in sufficient concentration, and if it is chosen to absorb across a substantial range of wavelengths to which the UV curable layer is sensitive, then the prepolymer will be substantially polymerized at the surface but will remain partially unpolymerized, or under-polymerized, in the interior of the coating. Thus, a tough, abrasion-resistant outer surface will be obtained on the coating, while obtaining a soft interior to reduce microbending losses.

It will be seen that the choice of the UV absorber and the concentration used will also depend on the spectral output characteristics of the UV radiation source used. For example, medium pressure mercury vapor lamps have considerable output at 330 nm and shorter wavelengths, the most damaging wavelengths for germanium and phosphorus-doped silica. Conversely, zenon lamps typically have relatively low output in this range. Thus, a higher concentration of UV absorber material is typically used in the case of mercury vapor lamps, with similar considerations applying to the other UV sources known in the art.

Numerous UV-absorbing materials that produce substantially no free radicals upon irradiation are known in the art, with some common examples listed in Table I below. At wavelengths shorter than the approximate cut-off wavelength shown, it is estimated that less than 10 percent of the radiation incident on a polymer coating 50 microns thick, doped with 1 percent of the given material by weight, will reach the glass fiber.

TABLE I

| ULTRAVIOLET ABSORBING MATERIALS | |
|---|---|
| Chemical Name | Cut-off Wavelength (Nanometers) |
| 2-hydroxy-4-methoxybenzophenone | 350 |
| 2,2'-dihydroxy-4-methoxybenzophenone | 390 |
| 2-hydroxy-4-methoxy-2'-carboxybenzophenone | 340 |
| 2-hydroxy-4-methoxy-5-sulfobenzophenone trihydrate | 340 |
| 2-hydroxy-4-n-octoxybenzophenone | 360 |
| (p-methoxybenzylidine) malonic acid, dimethylester | 340 |
| 2,4-di-tert-butylphenyl 3,5-di-tert-butyl-4-hydroxybenzoate | 280 |
| 2-(hydroxy-5-t-octylphenyl)-benzotriazole | 370 |

Although the UV-cured polymer used in the present embodiment has a cut-off wavelength of approximately 300 nm, other polymer materials will have different cut-off wavelengths. The choice of the absorber and the concentration used will of course depend in part upon the polymer cut-off wavelength. In addition, the choice of absorber and concentration will depend on the thickness of the coating, and the wavelength response of the photoinitiator, as well as whether a fully cured coating or a partially cured coating is desired, as discussed above. As mentioned above, the prepolymer material itself may be UV curable without the aid of a photoinitiator. In that case, the term "UV absorber" means any material that does not substantially promote curing of such prepolymer but which absorbs damaging UV radiation at least 100 times more strongly than a comparable amount of such prepolymer. The type of radiation source, and power level, will also affect the final design of the coating, according to the principles explained above. The spectral output of a given source can be modified by inserting a filter, such as glass of various types, between the radiation source and the coating, according to principles well known in the art.

The above discussion has been mainly in terms of optical fibers wherein both the core and cladding are silica. However, it is also known in the art to produce plastic fibers, typically of polymethylmethacrylate. Large UV doses can lead to optical degradation of plastic fibers also, albeit by different mechanisms than for silica fibers. It is also known in the art to produce composite fibers having a silica core, as typically drawn from a fused silica rod, but with a plastic cladding. Such cladding is typically a low refractive index polymer, frequently a silicone or fluorocarbon, having an optical loss of less than 2 db per meter. Both the plastic and composite optical fibers are included herein, along with the silica fibers, in the term "optical fiber".

A plurality of optical fibers that are coated by the above inventive technique may be jacketed together for ease of installation. Typically, 12 coated fibers are jacketed in a "tape", which may be further jacketed with other tapes to form a cable. Thus, the coated optical fiber itself typically operates in a dark environment after manufacture, due to one or more jackets. If intended for outdoor use, an outer jacket may contain UV absorbers, typically carbon black, to protect the jacket itself from solar UV damage, according to principles well known in the art.

All such variations and deviations through which the present invention has advanced the art are considered to be within the spirit and scope of the invention.

We claim:

1. A method of producing a coated optical fiber comprising the steps of drawing an optical fiber from a preform at a rate of at least 1 meter per second and applying an ultraviolet-curable layer comprising prepolymer material onto said optical fiber or onto an inner layer thereon, and at least partially polymerizing the prepolymer material by exposing and ultraviolet-curable layer to ultraviolet radiation, with said drawing, applying,, and exposing being one continuous operation, characterized IN THAT the ultraviolet-curable layer further comprises at least 0.1 weight percent ultraviolet-absorbing material that does not form a substantial amount of free radicals which promote polymerization of said prepolymer material during said exposing to ultraviolet radiation, whereby the optical loss in said optical fiber due to said exposing to ultraviolet radiation in substantially reduced.

2. The method of claim 1 further characterized in that said ultraviolet-curable layer further comprises photoinitiator material that forms free radicals in sufficient amount to promote polymerization of said prepolymer material when exposed to said ultraviolet radiation.

3. The method of claim 1 further characterized in that said ultraviolet-absorbing material does not substantially attenuate all radiation within the ultraviolet spectrum which causes said polymerization, thereby resulting in substantially complete curing of said ultraviolet-curable layer.

4. The method of claim 1 further characterized in that the ultraviolet-absorbing material is of such type and concentration as to prevent complete curing of the interior of said ultraviolet-curable layer.

5. A method of producing a coated optical fiber comprising the steps of drawing an optical fiber from a preform at a rate of at least 1 meter per second and forming one or more inner layers on said optical fiber and then applying an ultraviolet-curable layer onto an inner layer and exposing said ultraviolet-curable layer to ultraviolet radiation, with said drawing, forming, applying, and exposing being one continuous operation, characterized in that at least one inner layer further comprises at least 0.1 weight percent ultraviolet-absorbing material, whereby the optical loss in said optical fiber due to said exposing to ultraviolet radiation is substantially reduced.

6. The method of claims 1 or 5 further characterized in that said optical fiber has a silica core which further comprises germanium or phosphorus or both, with said optical fiber having a numerical aperture of at least 0.23.

7. The method of claims 1 or 5 further characterized in that said optical fiber has a silica core which further comprises a maximum concentration of at least 10 percent by weight of germanium dioxide.

8. The method of claim 7 further characterized in that said core further comprises a maximum concentration of at least 0.5 percent by weight of phosphorus pentoxide.

9. The method of claims 1 or 5 further characterized by jacketing at least one of said coated optical fibers to form a cable, whereby said fiber or fibers operate in a dark environment after manufacture.

10. The method of claims 1, 2, 3, 4, or 5 further characterized in that said ultraviolet-absorbing material is selected from the group consisting of: 2-hydroxy-4-methoxybenzophenone; 2,2'-dihydroxy-4-methoxybenzophenone; 2-hydroxy-4-methoxy-2'-carboxybenzophenone; 2-hydroxy-4-methoxy-5-sulfobenzophenone trihydrate; 2-hydroxy-4-n-octoxybenzophenone; (p-methoxybenzylidine) malonic acid, dimethylester; 2,4-di-tert-butylphenyl 3,5-di-tert-butyl-4-hydroxybenzoate; and 2-(hydroxy-5-t-octylphenyl)benzotriazole.

11. A coated optical fiber produced according to the method of claim 1.

12. A coated optical fiber produced according to the method of claim 5.

13. A coated optical fiber jacketed so as to operate in a dark environment, wherein said coated optical fiber comprises a coated layer comprising polymer material and photoinitiator material that forms free radicals suitable for promoting polymerization of said polymer material when exposed to ultraviolet radiation, characterized in that said coated layer comprises at least 0.1 weight percent ultraviolet-absorbing material that does not form a substantial amount of free radical which promote polymerization of said polymer material when exposed to ultraviolet radiation.

14. A coated optical fiber jacketed so as to operate in a dark environment, wherein said coated optical fiber compries an inner coated layer, and further comprises a surrounding coated layer thereon comprising material that is curable by ultraviolet radiation, characterized in that said inner coated layer comprises at least 0.1 weight percent of ultraviolet-absorbing material.

15. The fiber of claims 13 or 14 further characterized in that said optical fiber has a silica core which further comprises germanium or phosphorus or both, with said optical fiber having a numerical aperture of at least 0.23.

16. The fiber of claims 13 or 14 further characterized in that said optical fiber has a silica core which further comprises a maximum concentration of at least 10 percent by weight of germanium dioxide.

17. The fiber of claim 16 further characterized in that said core further comprises a maximum concentration of at least 0.5 percent by weight of phosphorus pentoxide.

18. The fiber of claims 13 or 14 further characterized in that said ultraviolet-absorbing material is selected from the group consisting of: 2-hydroxy-4-methoxybenzophenone; 2,2'-dihydroxy-4-methoxybenzophenone; 2-hydroxy-4-methoxy-2'-carboxybenzophenone; 2-hydroxy-4-methoxy-5-sulfobenzophenone trihydrate; 2-hydroxy-4-n-octoxybenzophenone; (p-methoxybenzylidene) malonic acid, dimethylester; 2,4-di-tert-butylphenyl 3,5-di-tert-butyl-4-hydroxybenzoate; and 2-(hydroxy-5-t-octylphenyl)benzotriazole.

* * * * *

UNITED STATES PATENT AND TRADEMARK OFFICE
CERTIFICATE OF CORRECTION

PATENT NO. : 4,482,204

DATED : November 13, 1984

INVENTOR(S) : Lee L. Blyler, Jr. and Frank V. DiMarcello

It is certified that error appears in the above-identified patent and that said Letters Patent is hereby corrected as shown below:

Column 1, line 60, "weavelengths" should read --wavelengths--. Column 2, line 66, "59KU0519U" should read --59KU05719U--. Column 4, line 5, "does" should read --dose--. Column 7, line 41, "and" should read --said--; line 51, "in" should read --is--.

Signed and Sealed this

Ninth Day of April 1985

[SEAL]

Attest:

DONALD J. QUIGG

Attesting Officer

Acting Commissioner of Patents and Trademarks